United States Patent
Moore

(10) Patent No.: US 9,151,386 B2
(45) Date of Patent: Oct. 6, 2015

(54) ACCUMULATOR MEMBRANE FOR A HYDRAULIC HAMMER

(71) Applicant: CATERPILLAR INC., Peoria, IL (US)

(72) Inventor: Cody Moore, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 13/839,878

(22) Filed: Mar. 15, 2013

(65) Prior Publication Data

US 2014/0261827 A1 Sep. 18, 2014

(51) Int. Cl.
*F16J 3/02* (2006.01)
*B25D 9/14* (2006.01)

(52) U.S. Cl.
CPC .. *F16J 3/02* (2013.01); *B25D 9/145* (2013.01)

(58) Field of Classification Search
CPC .................................. F15B 1/04; F15B 1/027
USPC ...................................................... 138/30, 31
See application file for complete search history.

(56) References Cited

U.S. PATENT DOCUMENTS

| | | | | |
|---|---|---|---|---|
| 2,841,180 A | * | 7/1958 | Pier | 138/30 |
| 2,841,181 A | * | 7/1958 | Hewitt et al. | 138/30 |
| 2,861,595 A | * | 11/1958 | Pier | 138/30 |
| 2,875,786 A | * | 3/1959 | Shelly | 138/30 |
| 2,875,787 A | * | 3/1959 | Evans | 138/30 |
| 2,875,788 A | * | 3/1959 | Pier | 138/30 |
| 3,063,470 A | * | 11/1962 | Forster | 138/30 |
| 3,612,105 A | * | 10/1971 | Martin | 138/30 |
| 3,754,396 A | | 8/1973 | Erma | |
| 3,853,036 A | | 12/1974 | Eskridge et al. | |
| 3,991,655 A | | 11/1976 | Bouyoucos et al. | |
| 4,011,795 A | | 3/1977 | Barthe et al. | |
| 4,186,775 A | * | 2/1980 | Muroi | 138/30 |
| 4,261,249 A | | 4/1981 | Grantmyre | |
| 4,732,176 A | * | 3/1988 | Sugimura | 138/30 |
| 4,759,387 A | * | 7/1988 | Arendt | 138/30 |
| 5,860,452 A | * | 1/1999 | Ellis | 138/30 |
| 6,073,706 A | | 6/2000 | Niemi | |
| 6,105,686 A | | 8/2000 | Niemi | |
| 7,353,845 B2 | * | 4/2008 | Underwood et al. | 138/30 |
| 8,567,444 B2 | * | 10/2013 | Marin et al. | 138/31 |
| 8,701,398 B2 | * | 4/2014 | Baseley et al. | 60/414 |

(Continued)

FOREIGN PATENT DOCUMENTS

| | | |
|---|---|---|
| EP | 0 933 169 A2 | 1/1999 |
| GB | 1480903 | 4/1973 |
| WO | WO 2004/020155 A1 | 3/2004 |

OTHER PUBLICATIONS

U.S. Patent Application of Cody Moore, entitled "Hydraulic Hammer Having Co-Axial Accumulator and Piston" filed Mar. 15, 2013.

(Continued)

*Primary Examiner* — Kevin P Shaver
*Assistant Examiner* — Michael J Melaragno
(74) *Attorney, Agent, or Firm* — Finnegan, Henderson, Farabow, Garrett & Dunner, LLP

(57) ABSTRACT

An accumulator membrane is disclosed. The accumulator membrane may include a generally cylindrical tube having a side wall with a first end a second end. A lip may be located at the first end, and may form a pocket with the side wall. An extension may protrude from the second end at an angle generally perpendicular to the lip and co-axial with the generally cylindrical tube.

15 Claims, 6 Drawing Sheets

(56) References Cited

U.S. PATENT DOCUMENTS

2003/0006052 A1    1/2003   Campbell, Jr.
2012/0138328 A1    6/2012   Teipel et al.

OTHER PUBLICATIONS

U.S. Patent Application of Cody Moore, entitled "Hydraulic Hammer Having Impact System Subassembly" filed Mar. 15, 2013.

* cited by examiner

ACCUMULATOR MEMBRANE FOR A HYDRAULIC HAMMER

TECHNICAL FIELD

The present disclosure is directed to an accumulator membrane and, more particularly, to an accumulator membrane for a hydraulic hammer.

BACKGROUND

Hydraulic hammers can be attached to various machines such as excavators, backhoes, tool carriers, or other like machines for the purpose of milling stone, concrete, and other construction materials. The hydraulic hammer is mounted to a boom of the machine and connected to a hydraulic system. High pressure fluid is then supplied to the hammer to drive a reciprocating piston and a work tool in contact with the piston. The piston is surrounded and protected by an outer housing. Traditionally, a valve directs fluid within the hammer from an accumulator to the piston. The accumulator provides a reservoir for the fluid.

U.S. Pat. No. 3,853,036 (the '036 patent) that issued to Eskridge et al. on Dec. 10, 1974, discloses an exemplary hydraulic hammer having many individuals components including a piston reciprocally located within an outer housing. An intake fluid reservoir and an outlet fluid reservoir are disposed around a valve at an axial end of the piston, wherein the fluid reservoirs form an accumulator. Each of the individual components is assembled into the outer housing separately.

The many individual components of the '036 patent (e.g. the piston, valve, and fluid reservoirs) may make servicing of the hydraulic hammer difficult. In particular, a user may be required to completely disassemble the hydraulic hammer to repair just one component. This complete disassembly may be expensive and increase a downtime of the associated machine. An increase in downtime can result in lost productivity.

The disclosed system is directed to overcoming one or more of the problems set forth above and/or other problems of the prior art.

SUMMARY

In one aspect, the present disclosure is directed to an accumulator membrane. The accumulator membrane may include a generally cylindrical tube having a side wall with a first end and a second end. A lip may be located at the first end, and may form a pocket with the side wall. An extension may be formed at the second end, and may protrude from the second end at an angle to the lip and co-axial with the generally cylindrical tube.

In another aspect, the present disclosure is directed to an accumulator membrane. The accumulator membrane may include a generally cylindrical tube having a side wall with a first end a second end. A lip may be formed at the first end. An extension may be formed at the second end, and oriented generally perpendicular to the lip. The generally cylindrical tube may have an internal volume of approximately 2.59 in a non-pressurized state.

DETAILED DESCRIPTION

Figure 1:
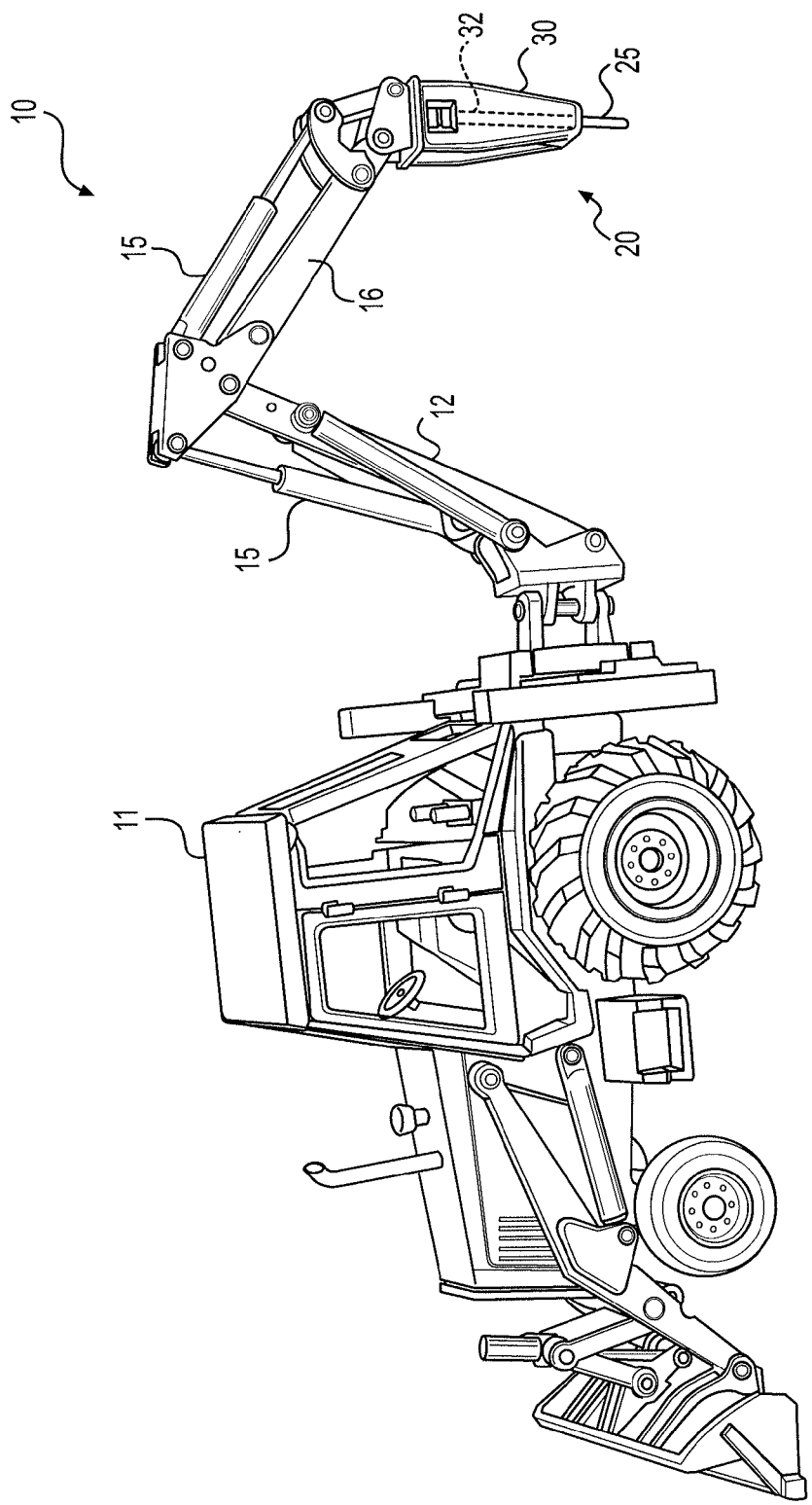
FIG. 1 is a diagrammatic illustration of an exemplary disclosed machine.

FIG. 1 illustrates an exemplary disclosed machine 10 having a hammer 20. Machine 10 may be configured to perform work associated with a particular industry such as, for example, mining or construction. For example, machine 10 may be a backhoe loader (shown in FIG. 1), an excavator, a skid steer loader, or any other machine. Hammer 20 may be pivotally connected to machine 10 through a boom 12 and a stick 16. It is contemplated that another linkage arrangement may alternatively be utilized, if desired.

In the disclosed embodiment, one or more hydraulic cylinders 15 may raise, lower, and/or swing boom 12 and stick 16 to correspondingly raise, lower, and/or swing hammer 20. The hydraulic cylinders 15 may be connected to a hydraulic supply system (not shown) within machine 10. Specifically, machine 10 may include a pump (not shown) connected to hydraulic cylinders 15 and to hammer 20 through one or more hydraulic supply lines (not shown). The hydraulic supply system may introduce pressurized fluid, for example oil, from the pump and into the hydraulic cylinders 15 of hammer 20. Operator controls for movement of hydraulic cylinders 15 and/or hammer 20 may be located within a cabin 11 of machine 10.

As shown in FIG. 1, hammer 20 may include an outer shell 30 and an actuator assembly 32 located within outer shell 30. Outer shell 30 may connect actuator assembly 32 to stick 16 and provide protection for actuator assembly 32. A work tool 25 may be operatively connected to an end of actuator assembly 32 opposite stick 16. It is contemplated that work tool 25 may include any known tool capable of interacting with hammer 20. In one embodiment, work tool 25 includes a chisel bit.

Figure 2:
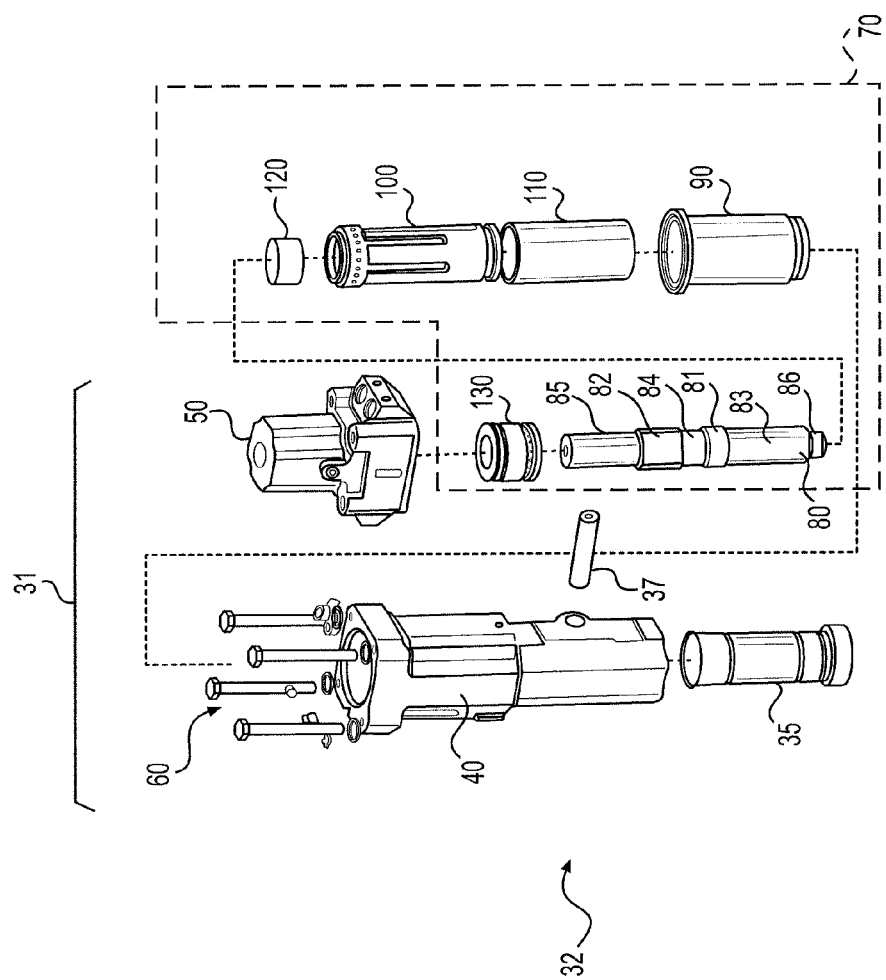
FIG. 2 is an exploded view illustration of an exemplary disclosed hydraulic hammer assembly that may be used with the machine of FIG. 1.

As shown in FIG. 2, actuator assembly 32 may include a subhousing 31, a bushing 35, and an impact system 70. Subhousing 31 may include, among other things, a frame 40 and a head 50. Frame 40 may be a hollow cylindrical body having one or more flanges or steps along its axial length. Head 50 may cap off one end of frame 40. Specifically, one or more flanges on head 50 may couple with one or more flanges on frame 40 to provide a sealing engagement. One or more fastening mechanisms 60 may rigidly attach head 50 to frame 40. In some embodiments, fastening mechanism 60 may include, for example, screws, nuts, bolts, or any other means capable of securing the two components. Frame 40 and head 50 may each include holes to receive fastening mechanism 60.

Bushing 35 may be disposed within a tool end of subhousing 31 and configured to connect work tool 25 to impact system 70. A pin 37 may connect bushing 35 to work tool 25.

When displaced by hammer 20, work tool 25 may be configured to move a predetermined axial distance within bushing 35.

Impact system 70 may be disposed within an actuator end of subhousing 31 and configured to move work tool 25 when supplied with pressurized fluid. As shown by the dotted lines in FIG. 2, impact system 70 may be an assembly including a piston 80, an accumulator membrane 90, a sleeve 100, a sleeve liner 110, a valve 120, and a seal carrier 130. Sleeve liner 110 may be assembled within accumulator membrane 90, sleeve 100 may be assembled within sleeve liner 110, and piston 80 may be assembled within sleeve 100. All of these components may be generally co-axial with each other. Valve 120 may be assembled over an end of piston 80 and may be located radially inward of both sleeve 100 and seal carrier 130. A portion of seal carrier 130 may axially overlap with sleeve 100. Additionally, valve 120 may be disposed axially external to accumulator membrane 90. Valve 120 and seal carrier 130 may be located entirely within head 50. Accumulator membrane 90, sleeve 100, and sleeve liner 110 may be located within frame 40. Head 50 may be configured to close off an end of sleeve 100 when connected to frame 40. Furthermore, piston 80 may be configured to slide within both frame 40 and head 50 during operation.

Piston 80 may be configured to reciprocate within frame 40 and contact an end of work tool 25. In the disclosed embodiment, piston 80 is a metal cylindrical rod (e.g. a steel rod) approximately 20.0 inches in length. Piston 80 may comprise varying diameters along its length, for example one or more narrow diameter sections disposed axially between wider diameter sections. In the disclosed embodiment, piston 80 includes three narrow diameter sections 83, 84, 85, separated by two wide diameter sections 81, 82. Narrow diameter sections 83, 84, 85 may cooperate with sleeve 100 to selectively open and close fluid pathways within sleeve 100.

Narrow diameter sections 83, 84, 85, may comprise axial lengths sufficient to facilitate fluid communication with accumulator membrane 90. In one embodiment, narrow diameter sections 83, 84, 85 may comprise lengths of approximately 6.3 inches, 2.2 inches, and 5.5 inches, respectively. Additionally, narrow diameter sections 83, 84, 85 may each comprise a diameter suitable to selectively open and close the fluid pathways in sleeve 100, for example diameters of approximately 2.7 inches. Wide diameter sections 81, 82, in one embodiment, may each comprise a diameter of approximately 3.0 inches and be configured to slideably engage an inner surface of sleeve 100. However, in other embodiments, any desired dimensions may be used.

Piston 80 may further include an impact end 86 having a smaller diameter than any of narrow diameter sections 83, 84, 85. Impact end 86, may be configured to contact work tool 25 within bushing 35. In one embodiment, impact end 86 may comprise an axial length of approximately 1.5 inches. However, in other embodiments, any desired dimensions may be used.

Accumulator membrane 90 may form a generally cylindrical tube configured to hold a sufficient amount of pressurized fluid for hammer 20 to drive piston 80 through at least one stroke. In one embodiment, accumulator membrane 90 may form a volume of 0.3 liters in an annular space 170 between accumulator membrane 90 and sleeve 100. However, in other embodiments, any desired dimension may be used for accumulator membrane 90.

Sleeve 100 may form a cylindrical tube having an axial length longer than an axial length of accumulator membrane 90. Sleeve 100 may include a first end 101, located near work tool 25, and a second end 102 located further from work tool 25. A recess 109 may be formed in sleeve 100 at first end 101. In one embodiment, sleeve 100 may have a length of approximately 13 inches. However, in other embodiments, any desired length may be used. One or more fluid passages may be formed within sleeve 100 that extend between piston 80 and accumulator membrane 90. Movement of piston 80 (i.e., of narrow diameter sections 83, 84, 85 and wide diameter sections 81, 82) may selectively open or close these passages. During assembly, sleeve 100 may be configured to slide over a bottom portion of narrow diameter section 83 of piston 80 and sealingly engage wide diameter section 82.

Figure 3:
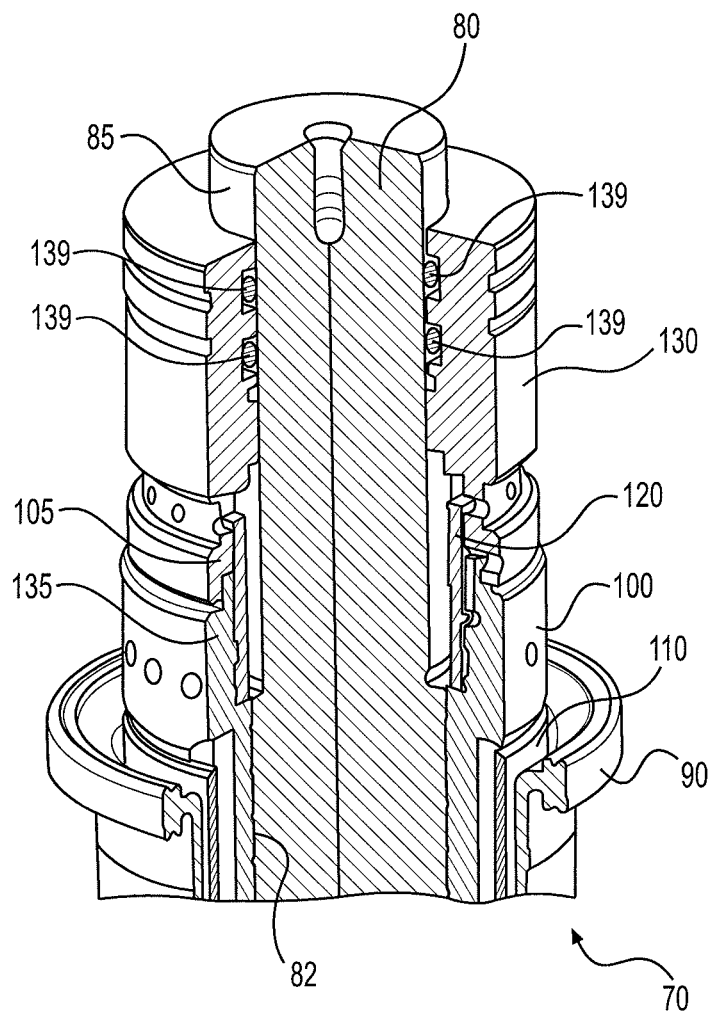
FIG. 3 is a cutaway view illustration of the hydraulic hammer assembly of FIG. 2.

Valve 120 may include a tubular member located external to and at an axial end of accumulator membrane 90. Valve 120 may be disposed around piston 80 at narrow diameter section 85, and radially inward of sleeve 100, between sleeve 100 and piston 80. As shown in FIG. 3, valve 120 may be located inward of both sleeve 100 and seal carrier 130 such that sleeve 100 surrounds a bottom portion of valve 120 (i.e., a portion closer to lip 95) and seal carrier 130 surrounds a top portion of valve 120 (i.e., a portion opposite lip 95). A cavity 123 may be formed between sleeve 100 and piston 80 and between seal carrier 130 and piston 80. Sleeve 100 and seal carrier 130 may overlap each other to form cavity 123. Valve 120 may be disposed within cavity 123.

Figure 4:
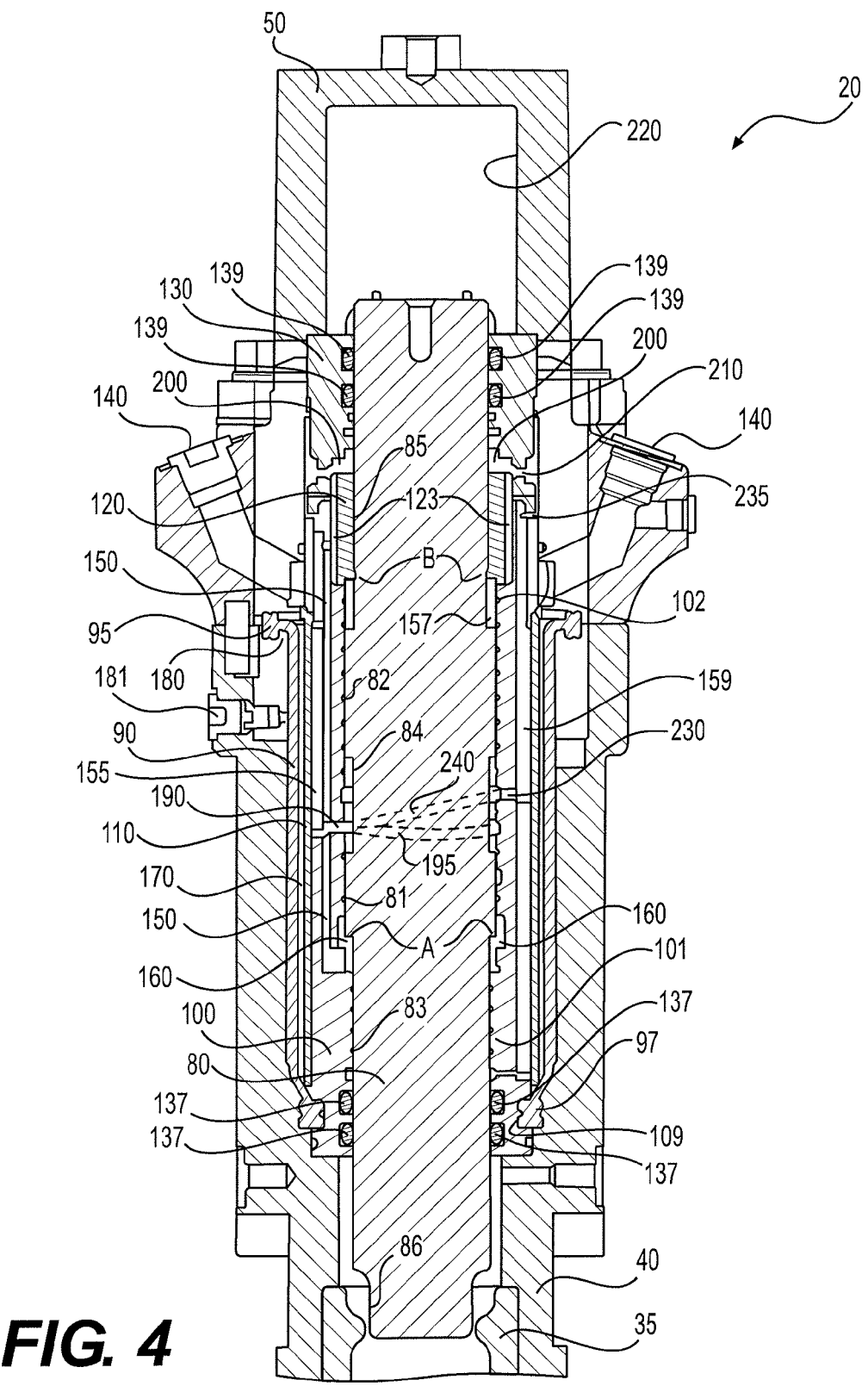
FIG. 4 is a cross-sectional illustration of the hydraulic hammer assembly of FIG. 2.

As shown in FIG. 3, piston 80, sleeve 100, valve 120, and seal carrier 130 may be held together as a sub-assembly by way of slip-fit radial tolerances. For example, slip-fit radial tolerances may be formed between sleeve 100 and piston 80 and between seal carrier 130 and piston 80. Sleeve 100 may apply an inward radial pressure on piston 80, and seal carrier 130 may apply an inward radial pressure on piston 80. Such may hold sleeve 100, seal carrier 130, and piston 80 together, and may hold valve 120 within cavity 123 (FIG. 4).

A first seal 137 and a second seal 139 may additionally secure the sub-assembly so that it remains assembled when removed from frame 40. First seal 137 may include one or more U-cup seals or O-rings disposed between sleeve 100 and piston 80. As shown in FIG. 4, first seal 137 may be compressed during assembly to generate a radial force on sleeve 100 and piston 80 after assembly that secures sleeve 100 to piston 80. Second seal 139 may include one or more U-cup seals or O-rings disposed between seal carrier 130 and piston 80. As also shown in FIG. 4, second seal 139 may be compressed during assembly to generate a radial force on seal carrier 130 and piston 80 after assembly that secures seal carrier 130 to piston 80. First and second seals 137, 139 may secure the sub-assembly, such that valve 120 is trapped within cavity 123. Valve 120 may be configured to move up and down within cavity 123.

Sleeve 100 and seal carrier 130 may additionally be secured together with a coupling including a slip fit, interference, or any other coupling known in the art. For example, seal carrier 130 may include a female connector 105 received by a male connector 135 on sleeve 100. The female and male connectors 105, 135, of the coupling, may secure seal carrier 130 with sleeve 100 and thereby also secure valve 120 against piston 80.

Accumulator membrane 90 may be connected with sleeve 100 through an interference coupling. Specifically, an extension 97, of accumulator membrane 90, may be received within recess 109, of sleeve 100, to couple accumulator membrane 90 with sleeve 100. This connection may further hold impact system 70 together when impact system 70 is removed from frame 40.

As also shown in FIGS. 3 and 4, impact system 70 may include a plurality of longitudinal recesses 150, 155, 157, 159 configured to direct fluid within hammer 20 to move piston

80. First, second, and fourth longitudinal recesses 150, 155, 159, respectively, may be formed as grooves and/or slots within sleeve 100, and third longitudinal recess 157 may be formed as a groove/slot disposed between valve 120 and piston 80. An inlet 140 may be formed within head 50 and extend inward to communicate with the plurality of longitudinal recesses 150, 155, 157, 159. The grooves and/or slots may be of sufficient size for the fluid to be drawn from inlet 140 down toward bushing 35, within sleeve 100, by a gravitational force.

One or more first longitudinal recesses 150 may fluidly connect inlet 140 with an annular groove 160 formed at an internal surface of sleeve 100. Annular groove 160 may be formed as a concentrically arranged passage around piston 80 With this configuration, fluid may flow from inlet 140, through first longitudinal recesses 150, into annular groove 160, and into contact with a shoulder A at wide diameter section 81 of piston 80.

Inlet 140 may additionally communicate with an annular space 170 that exists between accumulator membrane 90 and sleeve liner 110. Pressurized gas selectively introduced into a pocket 180 via gas inlet 181 may apply inward pressure to accumulator membrane 90 and affect the size of annular space 170. That is, as shown in FIG. 4, accumulator membrane 90 may be radially spaced apart from sleeve 100 when accumulator membrane 90 is in a relaxed state (i.e. not under pressure from the gas). For example, accumulator membrane 90 may be spaced approximately 8.0 mm from sleeve 100 when in the relaxed state. Fluid may flow within annular space 170 when accumulator membrane 90 is in the relaxed state. However, when accumulator membrane 90 is under pressure from the pressurized gas, no spacing may exist between accumulator membrane 90 and sleeve 100, and fluid flow therebetween may be inhibited.

A plurality of radial passages 190 may be concentrically formed within an annular wall of sleeve 100 and connect to a first annular ring 195, formed as a concentrically arranged passage around piston 80. First annular ring 195 may fluidly connect radial passages 190 with recesses 150, 155, 157, 159 for movement of fluid to and from recesses 150, 155, 157, 159. Additionally, radial passages 190 may be disposed below valve 120, for example between seal carrier 130 and annular groove 160.

At least one of the first longitudinal recesses 150 may fluidly connect to at least one of the plurality of radial passages 190, such that first longitudinal recesses 150 may fluidly connect radial passages 190 with accumulator membrane 90. This connection may be an indirect connection, around an end of sleeve liner 110. Additionally, first longitudinal recesses 150 may fluidly connect annular groove 160 with accumulator membrane 90 via radial passages 190. Radial passages 190 may be disposed above annular groove 160 such that annular groove 160 is disposed between impact end 86 of piston 80 and radial passages 190.

Figure 5A:
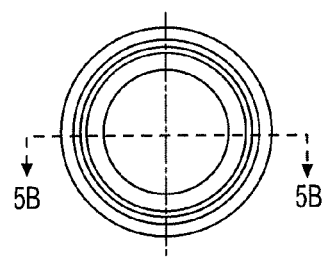
FIGS. 5A and 5B are cross-sectional illustrations of an exemplary disclosed accumulator membrane that may be used with the hydraulic hammer assembly of FIG. 2.

Each of the plurality of radial passages 190 may further connect first longitudinal recesses 150 to valve 120 via second longitudinal recess 155. As shown in FIG. 5, each of the plurality of radial passages 190 may connect first longitudinal recesses 150 with second longitudinal recess 155. Therefore, when radial passages 190 are open (i.e. upon movement of wide diameter section 81 of piston 80 toward valve 120), fluid may flow from first longitudinal recesses 150, through radial passages 190 and into second longitudinal recess 155. Additionally, fluid within annular groove 160 may flow within first longitudinal recesses 150 toward valve 120, through radial passages 190, and into second longitudinal recess 155. Second longitudinal recess 155 may direct the fluid toward valve 120 and selectively open a fluid chamber 200 via a third longitudinal recess 157.

Fluid chamber 200 may be formed within head 50 and located axially adjacent to a base end of valve 120. Therefore, valve 120 may be located between fluid chamber 200 and radial passages 190. Additionally, fluid chamber 200 may be formed at least partially within seal carrier 130 and co-axial to piston 80. Third longitudinal recess 157 may selectively connect inlet 140 with fluid chamber 200 and be disposed between valve 120 and piston 80.

A plurality of outlet apertures 210 may be formed within seal carrier 130 and fluidly connected with fluid chamber 200. Therefore, outlet apertures 210 may be fluidly connected with radial passages 190 via recesses 150, 157 and fluid chamber 200. Fluid may be selectively released from fluid chamber 200 through outlet apertures 210. As shown in FIG. 4, outlet apertures 210 may be disposed external to accumulator membrane 90, between a gas chamber 220 and a lip 95 of accumulator membrane 90.

Movement of narrow diameter section 84 of piston 80 may selectively connect radial passages 190 with an outlet passage 230 via a second annular ring 240. Outlet passage 230 may be disposed external to valve 120. As shown in FIG. 4, second longitudinal recess 155 may be selectively connected to radial passages 190, second annular ring 240, and outlet passage 230 to release fluid within second longitudinal recess 155 from hammer 20. Fourth longitudinal recess 159 may fluidly connect outlet passage 230 with outlet 235. As also shown in FIG. 4, outlet 235 may include one or more apertures formed through sleeve 100 and disposed between fluid chamber 200 and lip 95.

FIG. 4 further illustrates gas chamber 220 disposed within head 50 at an end of piston 80 opposite bushing 35. Gas chamber 220 may be located axially adjacent to fluid chamber 200, and may be configured to contain a compressible gas, for example nitrogen gas. Piston 80 may be slideably moveable within gas chamber 220 to increase and decrease the size of gas chamber 220. A decrease in size of gas chamber 220 may increase the gas pressure within gas chamber 220.

Figure 5B:
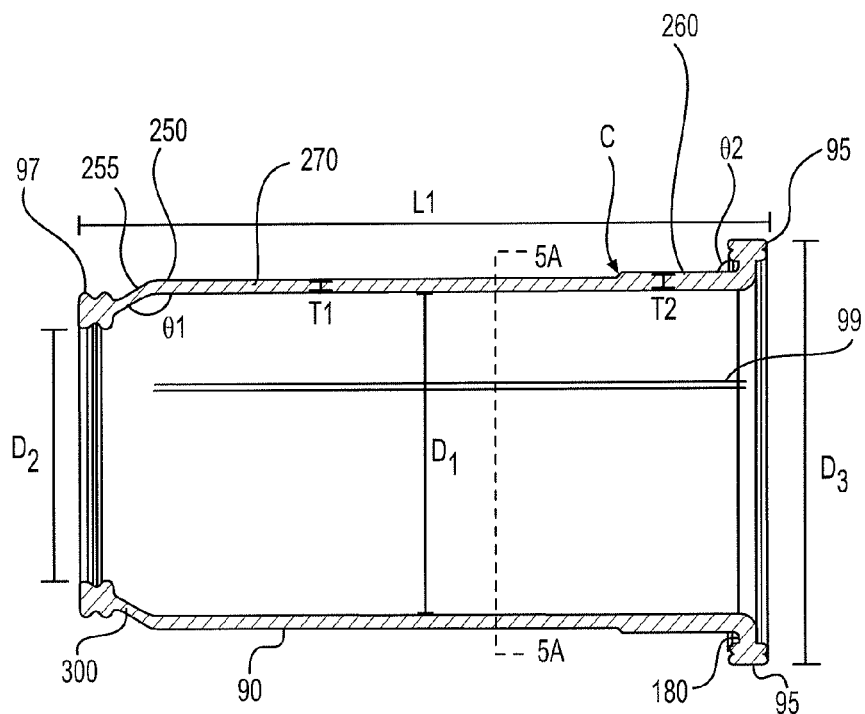

FIGS. 5A, 5B, 6, and 7 show one particular embodiment of accumulator membrane 90. In this embodiment, extension 97 may be formed at a first end 250 (i.e. near work tool 25) of accumulator membrane 90, and lip 95 may be formed at a second end 260 (i.e. near valve 120) of accumulator membrane 90. An annular side wall 270 may extend between extension 97 and lip 95, and may form an approximately straight surface. Internal and external surfaces of side wall 270 may be substantially smooth surfaces. Accumulator membrane 90 may extend a length L1 from extension 97 to lip 95, as shown in FIG. 5B. In the disclosed embodiment, accumulator membrane 90 extends a length L1 equal to approximately one-half an axial length of piston 80. For example, accumulator membrane 90 may have an axial length L1 between approximately 5.9 in. and approximately 23.6 in. In one embodiment, L1 may have an axial length of approximately 10.0 in. Additionally, accumulator membrane 90 may have a midpoint diameter D1, a diameter D2 at first end 250, and a diameter D3 at second end 260. In general, D3 may be greater than D1, and D1 may be greater than D2. A ratio of D1 relative to D2 may be considered a first diameter ratio, and have a value from about 1.00 to about 2.00, for example a value of about 1.28. A ratio of D2 relative to D3 may be considered a second diameter ratio, and have a value from about 0.40 to about 0.90, for example a value of about 0.60. Additionally, a ratio of D1 relative to D3 may be considered a third diameter ratio, and have a value from about 0.40 to about 0.90, for example a value of about 0.78. An accumulator membrane having diameter ratio values below the disclosed values may not be large enough to hold an amount of oil sufficient to drive piston 80 through a piston stroke. Additionally, an accumulator membrane having diameter ratio values above the disclosed values may not sufficiently pressurize accumulator membrane 90 around sleeve 100.

Accumulator membrane 90 may have a thickness T1 at first end 250 and a thickness T2 at second end 260, wherein T2 is generally greater than T1. For example, T1 may have a value from about 0.08 in. to about 0.19 in., and T2 may have a value from about 0.08 in. to about 0.28 in. In one embodiment, T1 may be about equal to 0.16 in. and T2 may be about equal to 0.18 in. The thickness of accumulator membrane 90 may change from thickness T1 to thickness T2 at transition point C. In the disclosed embodiment, transition point C may be located about 0.7 in. from lip 95. The ratio of thickness T1 relative to thickness T2 may be considered a wall thickness ratio. Depending on the application, the wall thickness ratio may be from about 0.60 to about 1.00. In one embodiment, the wall thickness ratio may be about equal to 0.89. A wall thickness ratio below the disclosed ranges may make accumulator membrane 90 too fragile for intended purposes, and a wall thickness ratio above the disclosed ranges may make accumulator membrane 90 too stiff for intended purposes.

A ratio of length L1 relative to thickness T1 may be considered a thigh ratio, and may have a value from about 20.00 to about 100.00. In one embodiment, the thigh ratio may be about equal to 63.69. Accumulator membrane 90 may not be strong enough for intended applications with a thigh ratio below the disclosed ranges. Additionally, a thigh ratio above the disclosed ranges may produce an accumulator membrane that does not properly seal with sleeve 100. A ratio of length L1 relative to diameter D1 may be considered a dial ratio, and may have a value from about 1.50 to about 3.00. In one embodiment, the dial ratio may have a value about equal to 2.09. Similar to the thigh ratio, a dial ratio below the disclosed ranges may produce an accumulator membrane that is not strong enough for intended applications, and a dial ratio above the disclosed ranges may produce an accumulator membrane that does not properly seal with sleeve 100.

Extension 97 may be disposed generally co-axial with side wall 270. As shown in FIG. 5B, extension 97 may include a wall 300 that protrudes inward from side wall 270, forming a cylindrical extension at a front end portion 255. It is further contemplated that front end portion 255 may be generally conical, and may extend from about 0.2 in. to about 2.4 in. between side wall 270 and extension 97. For example, front end portion 255 may be 0.6 in. in length. In one embodiment, wall 300 may have a thickness about equal to thickness T1. A rib 99 may extend along an internal surface of accumulator membrane 90 from front end portion 255 to lip 95, as shown in FIG. 5B. Wall 300 may form an angle θ1 with side wall 270 and, in one embodiment, θ1 may be approximately 150 degrees. However, it is further contemplated that θ1 may be from about 90 degrees to about 150 degrees depending on the application.

Figure 6:
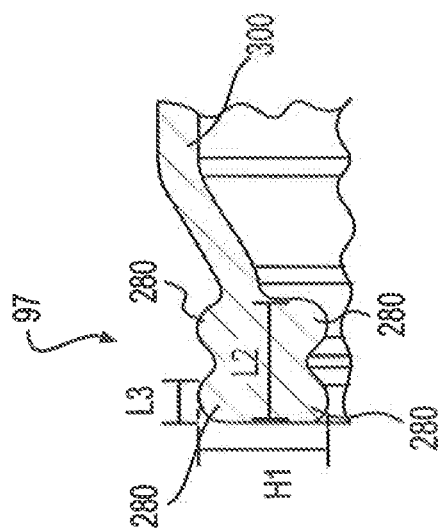
FIG. 6 is a cross-sectional illustration of an exemplary disclosed extension of the accumulator membrane of FIG. 5.

As shown in FIG. 6, extension 97 may have a length L2 ranging from about 0.2 in. to about 0.7 in. For example, L2 may have a length about equal to 0.5 in. Extension 97 may include at least two radial protrusions or undulations 280. In one embodiment, extension 97 may have four protrusions 280 (two on each side of extension 97), and each protrusion 280 may have a length L3 equal to about one-half of the value of length L2. In one embodiment, length L3 may be about equal to 0.3 in. Protrusions 280 may be configured to be compressed during insertion into recess 109 of sleeve 100, and then uncompressed within recess 109. This may hold extension 97 in place within recess 109. Extension 97 may include an extension protrusion ratio defined as a ratio of L2 relative to L3 having a value from about 1.80 to about 2.20, for example about equal to 1.96. Accumulator membrane 90 may not properly engage with sleeve 100 when the extension protrusion ratio is above or below the disclosed ranges. For example, protrusions 280 may fail to properly compress. Additionally, extension 97 may include a first angle ratio, for example a ratio of θ1 relative to L2. First angle ratio may be equal to about 150 to about 450, for example equal to about 294. A first angle ratio above or below the disclosed ranges may not properly hold the assembly together. A thickness profile ratio of extension 97 may be defined as a ratio length L2 relative to thickness T1 and, for example, may have a value from about 1.59 to about 4.77. In one embodiment, the thickness profile ratio of extension 97 may be about equal to 3.18. Accumulator membrane 90 may be too fragile with thickness profile ratio values below the disclosed ranges, and accumulator membrane 90 may be too stiff with thickness profile ratio values above the disclosed ranges.

As shown in FIG. 6, extension 97 may include a height H1 having a value from about 0.2 in. to about 0.7 in., for example, height H1 may be equal to about 0.5 in. A ratio of height H1 relative to length L2 may be considered a first height profile ratio, and may have a value from about 0.80 to about 1.20. In the disclosed embodiment, the first height profile ratio may be about equal to 1.03. Accumulator membrane 90 may not properly seal with sleeve 100 when the first height profile ratio is above or below the disclosed ranges. A ratio of height H1 relative to length L3 may be considered a second height profile ratio, wherein the second height profile ratio may be from about 1.80 to about 2.20. In the disclosed embodiment, the second height profile ratio may be about equal to 2.04. Additionally, accumulator membrane 90 may not properly seal with sleeve 100 when the second height profile ratio is above or below the disclosed ranges.

Figure 7:
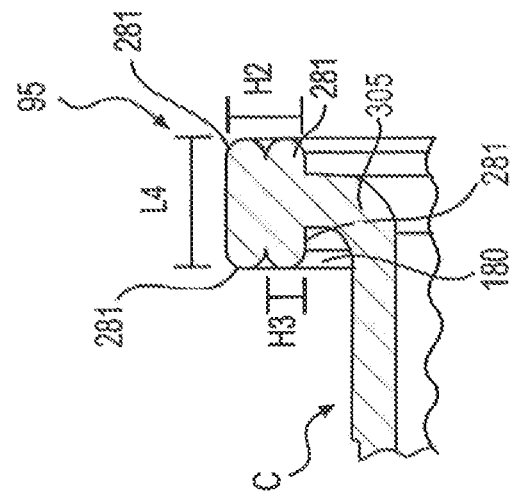
FIG. 7 is a cross-sectional illustration of an exemplary disclosed lip of the accumulator membrane of FIG. 5.

Lip 95 may protrude generally perpendicular to side wall 270 and extension 97, forming a general J-shape with side wall 270, as shown in FIG. 5B. For example, lip 95 may extend at an angle θ2 away from side wall 270, wherein θ2 may equal about 90 degrees. It is further contemplated that θ2 may be from about 90 degrees to about 150 degrees depending on the application. As shown in FIG. 7, lip 95 may have a height H2 ranging from about 0.1 in. to about 0.5 in. In one embodiment, height H2 may equal to about 0.3 in. Additionally, lip 95 may have at least two axial protrusions or undulations 281. In one embodiment, lip 95 may have four protrusions 281 (two on each side of lip 95), and each protrusion 281 may have a height H3 equal to about one-half of height H2. In one embodiment, height H3 may be about equal to 0.2 in. Protrusions 281 may be configured to be compressed during insertion into a recess (not shown) of frame 40, and then uncompressed within frame 40. This may hold lip 95 in place within frame 40. Lip 95 may include a lip protrusion ratio, for example a ratio of H2 relative to H3 that may have a value from about 1.80 to about 2.20. In one embodiment, the lip protrusion ratio may be about equal to 1.96. Accumulator membrane 90 may not properly engage with sleeve 100 when the lip protrusion ratio is above or below the disclosed ranges. For example, protrusions 281 may fail to properly compress. Additionally, lip 95 may include a first angle ratio, for example a ratio of θ2 relative to H2, which may be from about 150 to about 310. For example, the first angle ratio of lip 95 may be about equal to 290. A first angle ratio above or below the disclosed ranges may not properly hold the assembly together. A ratio of height H2 relative to thickness T1 may be considered a thickness profile ratio, and may have a value from about 1.59 to about 4.77. In one embodiment, the thickness profile ratio may be about equal to 1.91. Accumulator membrane 90 may be too fragile with thickness profile ratio values below the disclosed ranges, and accumulator membrane 90 may be too stiff with thickness profile ratio values above the disclosed ranges.

As also shown in FIG. 7, lip 95 may include a length L4 having a value from about 0.2 in. to about 0.7 in. For example, length L4 may be equal to about 0.5 in. In one embodiment, lip 95 may include a ratio of length L4 relative to height H2, considered a first height profile ratio, from about 1.00 to about 2.50. For example, the first height profile ratio may be equal to about 1.70. Accumulator membrane 90 may not properly seal with sleeve 100 when the first height profile ratio is above or below the disclosed ranges. A ratio of length L4 relative to height H3 may be considered a second height profile ratio and may be from about 2.00 to about 4.00. In one embodiment, the second height profile ratio may be about equal to 3.31. Additionally, accumulator membrane 90 may not properly seal with sleeve 100 when the second height profile ratio is above or below the disclosed ranges.

A wall 305 of lip 95, that may connect side wall 270 to protrusions 281, may have a thickness about equal to T2. In some embodiments, wall 305 may have a thickness less than protrusions 281, such that protrusions 281 extend backward over a portion of side wall 270 to create outer annular pocket 180 or channel with side wall 270. Accumulator membrane 90 may be made from a material sufficient for pressurized gas within pocket 180 to selectively compress accumulator membrane 90 inward toward piston 80. When pressurized to about 40-60 bar of nitrogen pressure, accumulator membrane 90 may have an internal volume of about 2.29 liters. However, when in a non-pressurized state, accumulator membrane 90 may expand outward and have an internal volume of about 2.59 liters. When sleeve 100 is disposed within accumulator membrane 90 and accumulator membrane 90 is pressurized to about 40-60 bar of nitrogen gas, accumulator membrane 90 may be disposed tightly around sleeve 100. For example, accumulator membrane 90 may form an internal volume of about 0.0 liters between side wall 270 and sleeve 100 in this pressurized state. However, when in a non-pressurized state, accumulator membrane 90 may form an internal volume of about 0.29 liters between side wall 270 and sleeve 100. In one embodiment, accumulator membrane 90 may be fabricated from an elastic material sufficient to expand outward, for example synthetic rubber. Specifically, the material may comprise a 70 durometer rubber. In other embodiments, accumulator membrane 90 may comprise any suitable material. It is further contemplated that the material of accumulator membrane 90 may affect the above disclosed ratios. For example, the above disclosed ratios may increase with materials having a durometer value above 70, and the above disclosed ratios may decrease with materials having a durometer value below 70.

INDUSTRIAL APPLICABILITY

The disclosed hydraulic hammer may have an impact system that can be assembled and removed from the hammer as a single integral unit. The impact system, being an integral subassembly, may not require placement of individual components and fastening during assembly. Instead, the subassembly as a whole may be a drop-in replacement assembly, which can help reduce service and downtime of the machine. Assembly of the impact system and servicing of machine 10 will now be described in detail.

Assembly of impact system 70, as shown in FIGS. 4 and 5, may include sliding sleeve 100 over a bottom portion of narrow diameter section 83, and arranging sleeve 100 external and co-axial to piston 80. First seal 137 may be compressed during this assembly, and thereby secure sleeve 100 to piston 80. The assembly may further include sliding accumulator membrane 90 over first end 101 of sleeve 100 and engaging extension 97 with recess 109. Specifically, extension 97 may be compressed and snapped within recess 109 and thereby hold accumulator membrane 90 and sleeve 100 together. Accumulator membrane 90 may be arranged external and co-axial to sleeve 100. Additionally, seal carrier 130 may be slid over narrow diameter section 85 and arranged external and co-axial to piston 80. Second seal 139 may be compressed during this assembly, and thereby secure seal carrier 130 to piston 80. Accordingly, impact system 70 may be held together as a single integral unit by compression of seals 137, 139 and by engagement of extension 97 with recess 109.

The arrangement of piston 80, sleeve 100, and seal carrier 130 may form cavity 123. Valve 120 may be trapped within cavity 123. Additionally, the arrangement of sleeve 100 and accumulator membrane 90 may trap sleeve liner 110 between sleeve 100 and accumulator membrane 90.

Impact system 70 may be removed from hammer 20 as one integral unit to facilitate faster service and low downtime of machine 10. For example, upon failure of first seal 137, instead of breaking down hammer 20 piece-by-piece until first seal 137 is exposed, impact system 70 may be removed as one integral unit to repair first seal 137. Specifically, hammer 20 may be removed from a linkage of machine 10, and actuator assembly 32 may be removed from outer shell 30. Therefore, head 50, frame 40, and impact system 70 may be removed from outer shell 30. Head 50 may then be removed from frame 40 to expose impact system 70. Hammer 20 may be removed from the linkage before head 50 is removed from frame 40. A user may remove impact system 70, from frame 40, as a single integral unit and place a new impact system 70 into frame 40. Head 50 may be reassembled with frame 40, and then actuator assembly 32 may be re-installed into outer shell 30. Hammer 20 may be re-assembled to the linkage of machine 10 after head 50 has been re-assembled to frame 40.

The failed component, for example, first seal 137, may be serviced in a shop at a later time, after impact system 70 has been removed from frame 40 and the new impact system 70 placed into frame 40. Therefore, first seal 137 may be serviced at a slower pace without affecting the downtime of machine 10.

The present disclosure may provide a hydraulic hammer having an impact system formed as a sub-assembly that may be removed from the hammer as one integral unit. Therefore, a user may remove the impact system from the hammer when repairing a component of the impact system instead of dissembling the entire hammer. This may reduce cost and time to repair the hammer and may reduce downtime of the machine associated with the hammer.

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. An accumulator membrane, comprising:
 a generally cylindrical tube having a side wall with a first end and a second end, wherein the second end of the side wall is thicker than the first end;
 a lip located at the second end and forming a pocket with the side wall; and
 an extension protruding from the first end at an angle generally perpendicular to the lip and co-axial with the generally cylindrical tube.

2. The accumulator membrane of claim 1, wherein the generally cylindrical tube has a dial ratio equal to about 1.50 to about 3.00.

3. The accumulator membrane of claim 2, wherein the dial ratio is about equal to 2.09.

4. The accumulator membrane of claim 1, wherein the extension forms a first angle ratio equal to about 150 to about 450.

5. The accumulator membrane of claim 4, wherein the first angle ratio is about equal to 294.

6. The accumulator membrane of claim 1, wherein a wall thickness ratio of a thickness of the first end relative to the second end is equal to about 0.60 to about 1.00.

7. The accumulator membrane of claim 6, wherein the wall thickness ratio is about equal to 0.89.

8. The accumulator membrane of claim 1, wherein the accumulator membrane is fabricated from a 70 durometer rubber.

9. The accumulator membrane of claim 1, wherein a second diameter ratio is equal to about 0.40 to about 0.90.

10. The accumulator membrane of claim 1, further including a generally conical extension formed at the first end.

11. The accumulator membrane of claim 1, wherein a thickness profile ratio of the extension is equal to about 1.59 to about 4.77.

12. The accumulator membrane of claim 1, wherein the extension includes at least two radial protrusions.

13. The accumulator membrane of claim 1, wherein a thickness profile ratio of the lip is equal to about 1.59 to about 4.77.

14. The accumulator membrane of claim 1, wherein the lip includes at least two axial protrusions.

15. The accumulator membrane of claim 1, wherein the lip substantially forms a J-shape with the cylindrical tube.

* * * * *